(12) United States Patent
Iida et al.

(10) Patent No.: US 8,375,706 B2
(45) Date of Patent: Feb. 19, 2013

(54) EXHAUST GAS PURIFICATION SYSTEM OF AN INTERNAL COMBUSTION ENGINE

(75) Inventors: Masahide Iida, Susono (JP); Nobumoto Ohashi, Susono (JP); Atsushi Hayashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 236 days.

(21) Appl. No.: 12/678,635

(22) PCT Filed: Sep. 18, 2008

(86) PCT No.: PCT/JP2008/066846
§ 371 (c)(1),
(2), (4) Date: Mar. 17, 2010

(87) PCT Pub. No.: WO2009/038123
PCT Pub. Date: Mar. 26, 2009

(65) Prior Publication Data
US 2010/0212296 A1 Aug. 26, 2010

(30) Foreign Application Priority Data
Sep. 18, 2007 (JP) .................. 2007-241129

(51) Int. Cl.
*F01N 3/00* (2006.01)
*F01N 3/10* (2006.01)
(52) U.S. Cl. ............. 60/295; 60/274; 60/286; 60/301
(58) Field of Classification Search ............ 60/286, 60/287, 295, 274, 301
See application file for complete search history.

(56) References Cited

U.S. PATENT DOCUMENTS

| 6,058,700 A * | 5/2000 | Yamashita et al. ........... 60/285 |
| 6,101,999 A * | 8/2000 | Ohashi et al. ................ 123/295 |

(Continued)

FOREIGN PATENT DOCUMENTS

| EP | 1 515 029 A2 | 3/2005 |
| EP | 1 818 522 A1 | 8/2007 |

(Continued)

OTHER PUBLICATIONS

Extended Search Report issued in European Patent Application No. 08832029.6 dated Oct. 18, 2011.

(Continued)

*Primary Examiner* — Thomas Denion
*Assistant Examiner* — Dapinder Singh
(74) *Attorney, Agent, or Firm* — Oliff & Berridge, PLC

(57) ABSTRACT

A technique is provided which is capable of completing SOx poisoning recovery control on a NOx storage reduction catalyst in a shorter period of time. In the course of the SOx poisoning recovery control, the degree of decrease of a SOx release speed resulting from a decrease in an amount of SOx occlusion of the NOx catalyst (the degree of decrease of the SOx release speed (Ddw)) with respect to that at the time of start of the SOx poisoning recovery control is estimated. In accordance with the increasing degree of decrease of the SOx release speed (Ddw), a catalyst bed temperature (Tc) is caused to rise up to a higher side target temperature (Tct), and at the same time an exhaust gas air fuel ratio (A/F) is caused to lower up to a richer side target air fuel ratio (A/Ft), whereby the SOx release speed Vsox during the SOx poisoning recovery control is suppressed from lowering.

6 Claims, 4 Drawing Sheets

U.S. PATENT DOCUMENTS

| | | |
|---|---|---|
| 6,233,923 B1 | 5/2001 | Itou et al. |
| 6,233,927 B1 * | 5/2001 | Hirota et al. ............... 60/297 |
| 6,922,988 B2 * | 8/2005 | Yamaguchi et al. ........... 60/286 |
| 7,603,845 B2 * | 10/2009 | Dionnet et al. ............... 60/274 |
| 7,669,410 B2 | 3/2010 | Nagaoka et al. |
| 2004/0055278 A1 * | 3/2004 | Miyoshi et al. ............... 60/272 |
| 2006/0191257 A1 | 8/2006 | Goralski, Jr. et al. |
| 2009/0077947 A1 | 3/2009 | Nagaoka et al. |

FOREIGN PATENT DOCUMENTS

| | | |
|---|---|---|
| EP | 1 835 138 A1 | 9/2007 |
| JP | A-2000-274228 | 10/2000 |
| JP | A-2001-349230 | 12/2001 |
| JP | A-2002-256858 | 9/2002 |
| JP | A-2003-97332 | 4/2003 |
| JP | A-2003-293747 | 10/2003 |
| JP | A-2005-90253 | 4/2005 |
| JP | A-2005-291039 | 10/2005 |
| JP | A-2006-57467 | 3/2006 |
| WO | WO 2006/073199 A1 | 7/2006 |

OTHER PUBLICATIONS

International Search Report for International Application No. PCT/JP2008/066846, mailed on Dec. 22, 2008.

* cited by examiner

EXHAUST GAS PURIFICATION SYSTEM OF AN INTERNAL COMBUSTION ENGINE

This application is the national phase application under 35 U.S.C. §371 of PCT international application No. PCT/JP2008/066846 filed on 18 Sep. 2008, which claims priority to Japanese patent application No. 2007-241129 filed on 18 Sep. 2007 the contents of which are incorporated herein by reference.

TECHNICAL FIELD

The present invention relates to an exhaust gas purification system of an internal combustion engine, and in particular to an exhaust gas purification system of an internal combustion engine which has a NOx storage reduction catalyst arranged in an exhaust passage.

BACKGROUND ART

There has been known an exhaust gas purification system that is provided with a NOx storage reduction catalyst in order to purify nitrogen oxides (NOx) in an exhaust gas discharged from an internal combustion engine, in particular an internal combustion engine in which lean burn combustion is carried out. This NOx storage reduction catalyst is a catalyst which performs the purification of an exhaust gas by occluding NOx in the exhaust gas into the catalyst in cases where an atmosphere around the catalyst is in a high oxygen concentration state, and reducing the occluded NOx in cases where the atmosphere around the catalyst is in a low oxygen concentration state with the presence of a reducing agent.

Sulfur oxides (SOx) in the exhaust gas as well as NOx therein are also occluded in the NOx storage reduction catalyst, so SOx poisoning occurs in which the exhaust gas purification function of the NOx storage reduction catalyst decreases in accordance with the increasing amount of SOx occlusion.

Accordingly, in order to eliminate the SOx poisoning of the NOx storage reduction catalyst, a control operation to cause the SOx occluded in the catalyst to be released therefrom (hereinafter, referred to as "SOx poisoning recovery control") may be carried out by raising the catalyst bed temperature of the NOx storage reduction catalyst to a temperature at which the release of the SOx can be made, and at the same time supplying a reducing agent so as to make the surrounding atmosphere of the NOx storage reduction catalyst into a stoichiometric or rich atmosphere.

In relation to this, there has been proposed a technique of changing the air fuel ratio of an exhaust gas (hereinafter, referred to as "the exhaust gas air fuel ratio") flowing into the NOx storage reduction catalyst to a richer side in accordance with the decreasing amount of SOx occluded in the NOx storage reduction catalyst in the course of the SOx poisoning recovery control (see, for example, a first patent document).

[First Patent Document] Japanese patent application laid-open No. 2005-90253

[Second Patent Document] Japanese patent application laid-open No. 2003-293747

[Third Patent Document] Japanese patent application laid-open No. 2005-291039

DISCLOSURE OF THE INVENTION

Problems to be Solved by the Invention

However, in cases where the exhaust gas air fuel ratio is changed to the richer side in accordance with the decreasing amount of SOx occlusion in the course of the SOx poisoning recovery control, an amount of reducing agent in excess of the oxidation function of the NOx storage reduction catalyst may be supplied to the NOx catalyst.

As a result, there will be a fear that a part of the reducing agent passing through the NOx storage reduction catalyst to a downstream side thereof may be emitted into the atmosphere thereby to generate a white smoke, or hydrogen sulfide ($H_2S$) may be emitted into the atmosphere, thereby inviting the generation of a nasty smell. In other words, the amount of reducing agent supplied to the NOx storage reduction catalyst will be restricted in order to suppress the generation of the white smoke or the generation of the nasty smell, so there might be a case in which it became difficult to complete the SOx poisoning recovery control at an early stage.

The present invention has been made in view of the above-mentioned circumstances, and has for its object to provide a technique which is capable of completing SOx poisoning recovery control in a shorter period of time in the course of the SOx poisoning recovery control with respect to a NOx storage reduction catalyst.

Means for Solving the Problems

An exhaust gas purification system of an internal combustion engine according to the present invention adopts the following units so as to achieve the above object.

That is, the system comprises:

a NOx storage reduction catalyst formed in an exhaust passage of the internal combustion engine;

an execution unit that executes SOx poisoning recovery control to cause SOx occluded in said NOx storage reduction catalyst to be released therefrom by supplying a reducing agent to said NOx storage reduction catalyst from an upstream side thereof thereby to raise the temperature of said NOx storage reduction catalyst and at the same time to lower the air fuel ratio of an exhaust gas flowing into said NOx storage reduction catalyst; and an estimation unit that estimates the degree of decrease of a SOx release speed with respect to that at the time of the start of the SOx poisoning recovery control resulting from a decrease in an amount of SOx occlusion of said NOx storage reduction catalyst in the course of said SOx poisoning recovery control;

wherein said execution unit causes the temperature of said NOx storage reduction catalyst to rise up to a higher side target temperature in accordance with the increasing degree of decrease of said SOx release speed estimated by said estimation unit.

When the SOx poisoning recovery control is executed on the NOx storage reduction catalyst (hereinafter also referred to simply as "the NOx catalyst"), the reducing agent is supplied to the NOx catalyst from the upstream side thereof. As a result, the temperature of the NOx catalyst rises, and at the same time the air fuel ratio of the exhaust gas (hereinafter also referred to as "the exhaust gas air fuel ratio") flowing into the NOx catalyst lowers, whereby the SOx occluded in the NOx catalyst is released.

Here, the release speed at the time when the SOx occluded in the NOx catalyst is released from the NOx catalyst has a correlation with the amount of SOx occlusion, the bed temperature catalyst, and the exhaust gas air fuel ratio. More specifically, the less the amount of SOx occlusion, the lower (slower) the SOx release speed becomes, and the higher the catalyst bed temperature, and the lower the exhaust gas air fuel ratio, the higher (faster) the SOx release speed becomes.

Accordingly, as the amount of SOx occlusion is decreasing in a gradual manner due to the release of SOx in the course of the SOx poisoning recovery control, the SOx release speed is decreasing in a gradual manner in cases where the catalyst bed temperature and the exhaust gas air fuel ratio during the SOx poisoning recovery control are set constant. As a result, there has been a case in which it becomes difficult to complete the SOx poisoning recovery control in a short period of time due to the decrease of the SOx release speed during the SOx poisoning recovery control.

Accordingly, in the present invention, in the course of the SOx poisoning recovery control, the degree of decrease of the SOx release speed resulting from the decrease in the amount of SOx occlusion of the NOx catalyst with respect to that at the time of the start of the SOx poisoning recovery control (hereinafter referred to simply as "the degree of decrease of the SOx release speed") is estimated. Here, the degree of decrease of the SOx release speed represents the extent to which the SOx release speed is decreased resulting from the decrease of the amount of SOx occlusion in comparison with that at the time of the start of the execution of the SOx poisoning recovery control if the catalyst bed temperature and the exhaust gas air fuel ratio during the SOx poisoning recovery control are set constant.

The above-mentioned degree of decrease of the SOx release speed increases from the start of the SOx poisoning recovery control toward the end thereof. As a consequence, in the present invention, the temperature of the NOx catalyst is raised to the higher side target temperature as the degree of decrease of the SOx release speed becomes larger. Here, the target temperature of the NOx catalyst is a temperature at which SOx can be released from the NOx catalyst, and is also a temperature that is set so as to make it possible to suppress the decrease of the SOx release speed even if the degree of decrease of the SOx release speed increases during the SOx poisoning recovery control.

According to the present invention, even if the amount of SOx occlusion is decreased to increase the degree of decrease of the SOx release speed due to the release of SOx from the NOx catalyst during the SOx poisoning recovery control, it is possible to promote the reduction reaction of the SOx in the NOx catalyst by causing the catalyst bed temperature to rise to the higher side target temperature. Accordingly, it becomes possible to suppress the decrease of the SOx release speed, whereby the SOx poisoning recovery control can be completed in a shorter period of time.

In addition, according to the present invention, in cases where there is a large amount of SOx occlusion at an early stage at the start of the SOx poisoning recovery control, the degree of decrease of the SOx release speed is set small and the target temperature of the catalyst bed temperature is set to a relatively low temperature, so it is possible to save the amount of consumption of the reducing agent.

Moreover, in the present invention, the execution unit may control such that said target temperature in the case of the degree of decrease of the SOx release speed being larger becomes equal to or higher than that in the case of the degree of decrease of the SOx release speed being smaller.

For example, a threshold is set for the degree of decrease of the SOx release speed, and in cases where the degree of decrease of the SOx release speed becomes larger than the threshold, the target temperature of the NOx catalyst may be changed to a higher temperature side. This threshold is a value of the degree of decrease of the SOx release speed with which it can be determined that there is a possibility that the SOx release speed may decrease excessively unless the catalyst bed temperature is caused to rise up to a higher temperature.

In addition, it is preferable to set a plurality of thresholds which are different in magnitude from one another, and to change the target temperature of the NOx catalyst to the higher temperature side in a stepwise manner each time the degree of decrease of the SOx release speed becomes larger than a larger threshold.

Further, the target temperature of the NOx catalyst in the present invention is not limited to being changed in a stepwise manner, but may be changed in a continuous manner. That is, the target temperature may be controlled in such a manner that the larger the degree of decrease of the SOx release speed, the higher the target temperature of the NOx catalyst becomes.

In addition, the execution unit in the present invention may decrease the exhaust gas air fuel ratio up to a richer side target air fuel ratio as the degree of decrease of the SOx release speed becomes larger. According to this, the ambient atmosphere of the NOx catalyst turns into a higher reducing atmosphere, so the reduction reaction of the SOx in the NOx catalyst can be promoted to a more extent. Accordingly, even if the degree of decrease of the SOx release speed is increased resulting from the decrease of the amount of SOx occlusion during the SOx poisoning recovery control, it is possible to suppress the SOx release speed from being decreased in a suitable manner.

Moreover, in the present invention, the execution unit may control such that the target air fuel ratio in the case of the degree of decrease of the SOx release speed being larger becomes equal to or lower than that in the case of the degree of decrease of the SOx release speed being smaller.

For example, similar to the case of changing the target temperature of the NOx catalyst, a threshold may be set for the degree of decrease of the SOx release speed, and in cases where the degree of decrease of the SOx release speed becomes larger than this threshold, the target air fuel ratio of the exhaust gas air fuel ratio may be changed to a richer side. This threshold is a value of the degree of decrease of the SOx release speed with which it can be determined that there is a possibility that the SOx release speed may decrease excessively unless the exhaust gas air fuel ratio is caused to lower to the richer side. In addition, it is more preferable to set a plurality of thresholds which are different in magnitude from one another, and to change the target air fuel ratio to the richer side in a stepwise manner each time the degree of decrease of the SOx release speed becomes larger than a larger threshold.

Further, the target air fuel ratio in the present invention is not limited to being changed in a stepwise manner, but may be changed in a continuous manner. That is, the target air fuel ratio may be controlled in such a manner that the larger the degree of decrease of the SOx release speed, the more the target air fuel ratio is shifted to the richer side.

Furthermore, the execution unit may change the target air fuel ratio of the exhaust gas air fuel ratio to the richer side after the temperature of the NOx catalyst actually has actually risen to the target temperature. Also, the execution unit may make the timing, at which the temperature of the NOx catalyst actually rises to the target temperature, and the timing, at which the target air fuel ratio of the exhaust gas air fuel ratio is changed to the richer side, substantially coincide with each other. According to this, there is no fear that an amount of reducing agent in excess of the oxidation function of the NOx catalyst may be supplied to the NOx catalyst. That is, it is possible to suppress the reducing agent supplied to the NOx catalyst from being released into the ambient air, thus making it possible to suppress the generation of a white smoke. In addition, it is also possible to suppress $H_2S$ from being released into the ambient air, thereby making it possible to suppress the generation of a nasty smell.

Here, it is to be noted that the units for solving the problems in the present invention can be used in combination as much as possible.

Effect of the Invention

In the SOx poisoning recovery control on the NOx storage reduction catalyst, the SOx poisoning recovery control can be completed in a shorter period of time.

EXPLANATION OF REFERENCE NUMERALS AND CHARACTERS

Figure 1:
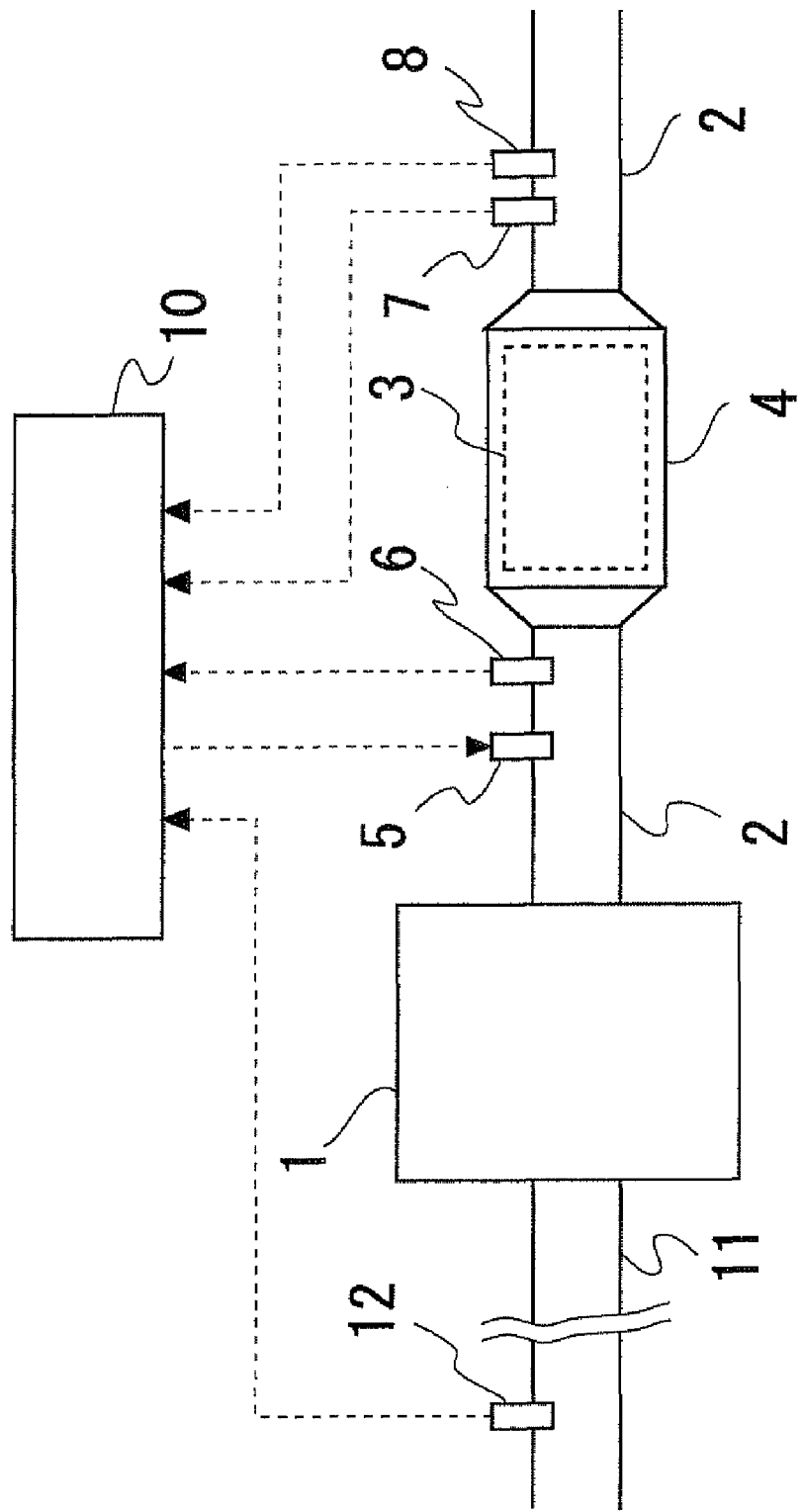
FIG. 1 is a view showing the schematic construction of an internal combustion engine and its intake and exhaust systems according to a first embodiment of the present invention.

1 Internal combustion engine
2 Exhaust pipe
3 NOx storage reduction catalyst
4 Catalytic converter
5 Fuel addition valve
6 Exhaust gas air fuel ratio sensor
7 Exhaust gas temperature sensor
8 SOx concentration sensor
10 ECU

BEST MODE FOR CARRYING OUT THE INVENTION

Hereinafter, the best mode for carrying out the present invention will be described in detail by way of example with reference to the attached drawings. Here, note that the dimensions, materials, shapes, relative arrangements and so on of component elements described in an embodiment of the present invention are not intended to limit the technical scope of the present invention to these alone in particular as long as there are no specific statements.

First Embodiment

Here, description will be made by taking as an example a case in which the present invention is applied to a diesel engine for driving a vehicle. FIG. 1 is a view showing the schematic construction of an internal combustion engine 1 and its intake and exhaust systems according to this embodiment of the present invention. In FIG. 1, an intake pipe 11 through which intake air to be sucked into the internal combustion engine 1 flows is connected to the internal combustion engine 1. In addition, in the middle of the intake pipe 11, there is arranged an air flow meter 12 that outputs a signal corresponding to the flow rate of the intake air flowing through the intake pipe 11. Also, connected to the internal combustion engine 1 is an exhaust pipe 2 through which an exhaust gas discharged from the internal combustion engine 1 flows, and the exhaust pipe 2 is also connected at its downstream side to a muffler which is not illustrated. Moreover, in the middle of the exhaust pipe 2, there is arranged a catalytic converter 4 in the interior of which a NOx storage reduction catalyst (hereinafter referred to simply as a "NOx catalyst") 3 is installed.

The NOx catalyst 3 occludes the NOx in the exhaust gas at the time when the air fuel ratio of the exhaust gas flowing into the NOx catalyst 3 (hereinafter referred to simply as an "exhaust gas air fuel ratio") A/F is high, such as when the internal combustion engine 1 is in an ordinary operating state, whereas it reduces and releases the occluded NOx at the time when the exhaust gas air fuel ratio A/F becomes low in the presence of a reducing component in the exhaust gas (i.e., in the presence of a reducing atmosphere).

Here, a fuel addition valve 5 for adding fuel as a reducing agent into the exhaust gas is arranged in the exhaust pipe 2 at the upstream side of the catalytic converter 4. In addition, an exhaust gas air fuel ratio sensor 6, which outputs an electrical signal corresponding to the air fuel ratio of the exhaust gas, is arranged in the exhaust pipe 2 at a location immediately upstream of the catalytic converter 4. Moreover, in the exhaust pipe 2 at a location immediately downstream of the catalytic converter 4, there are arranged an exhaust gas temperature sensor 7, which outputs an electrical signal corresponding to the temperature of the exhaust gas, and a SOx concentration sensor 8, which outputs an electrical signal corresponding to the SOx concentration of the exhaust gas.

In the internal combustion engine 1 constructed as stated above, there is arranged in combination therewith an ECU 10 which is an electronic control unit for controlling the internal combustion engine 1. This ECU 10 is a unit that controls the operating state of the internal combustion engine 1 in accordance with the operating conditions of the internal combustion engine 1 and/or driver's requirements.

The exhaust gas air fuel ratio sensor 6, the exhaust gas temperature sensor 7, the SOx concentration sensor 8, and the air flow meter 12 are connected to the ECU 10 through electrical wiring, and the outputs of these various sensors are inputted to the ECU 10. That is, the ECU 10 detects the exhaust gas air fuel ratio A/F from the output signal of the exhaust gas air fuel ratio sensor 6, and detects the temperature Tc of the NOx catalyst 3 (hereinafter referred to as "the catalyst bed temperature") from the output signal of the exhaust gas temperature sensor 7. In addition, the ECU 10 also detects the SOx concentration of the exhaust gas flowing out from the NOx catalyst 3 from the output signal of the SOx concentration sensor 8, and detects the amount of intake air from the output signal of the air flow meter 12. On the other hand, the fuel addition valve 5 is connected to the ECU 10 through electrical wiring, so that the fuel addition valve 5 is controlled by the ECU 10.

Next, reference will be made to the SOx poisoning recovery control of this embodiment in which the SOx occluded in the NOx catalyst 3 is caused to release. In the SOx poisoning recovery control, by adding fuel as a reducing agent into the exhaust gas from the fuel addition valve 5, the catalyst bed temperature Tc is caused to rise to a target temperature Tct at which the release of SOx can be made, and at the same time the exhaust gas air fuel ratio A/F is caused to decrease to a target exhaust gas air fuel ratio A/Ft which is a stoichiometric or rich air fuel ratio.

Figure 2:
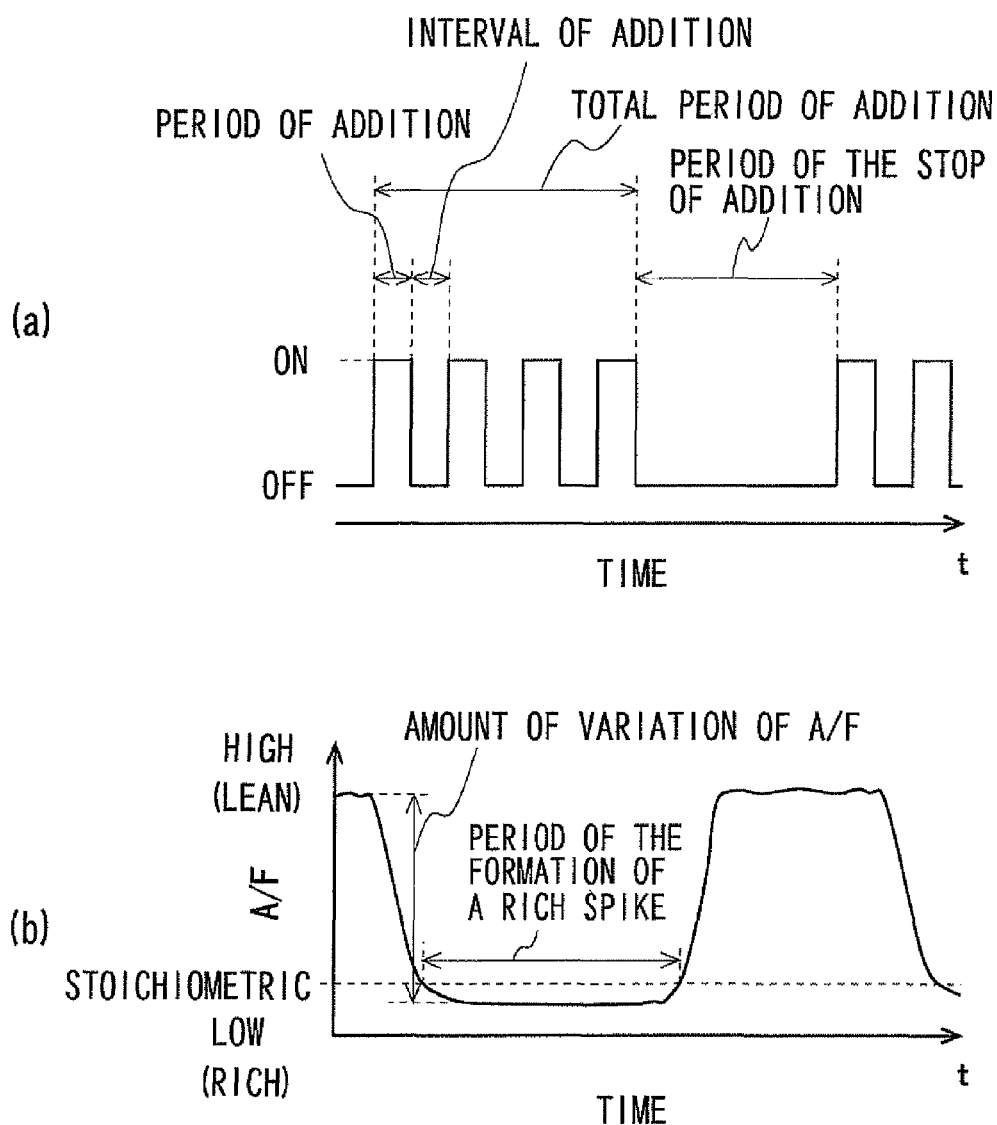
FIG. 2 is a view illustrating time charts of a command signal of an ECU to a fuel addition valve and its corresponding exhaust gas air fuel ratio A/F in SOx poisoning recovery control of the first embodiment, wherein (a) is a time chart of the command signal to the fuel addition valve, and (b) is a time chart of the exhaust gas air fuel ratio AIF.

Here, FIG. 2 is a view illustrating time charts of a command signal of the ECU 10 to the fuel addition valve 5 and its corresponding exhaust gas air fuel ratio A/F in the SOx poisoning recovery control according to this embodiment. FIG. 2(a) is a time chart showing the command signal to the fuel addition valve, and FIG. 2(b) is a time chart showing the exhaust gas air fuel ratio A/F. Here, when the command signal shown in FIG. 2(a) is on, the fuel addition valve 5 is opened so that fuel is added to the exhaust gas, whereas when the command signal is off, the fuel addition valve 5 is closed so that the addition of fuel is stopped.

As illustrated in these figures, the addition of fuel from the fuel addition valve 5 is carried out in an intermittent manner in the SOx poisoning recovery control. Here, a period of time for one time of fuel addition is called a period of addition (addition period), and a period of time between periods of additions is called an interval of addition (addition interval). In addition, a period of time in which fuel additions are performed in an intermittent manner is called a total period of addition (total addition period), and a period of time in which the intermittent fuel additions from the fuel addition valve 5 are stopped is called a period of the stop of addition (addition stop period).

Here, note that the longer the period of addition (FIG. 2(a)), the larger the amount of variation of the exhaust gas air fuel ratio A/F (FIG. 2(b)) becomes, and the longer the total period of addition (FIG. 2(a)) (i.e., the more the number of times of addition), the longer the period of formation of a rich spike (FIG. 2(b)) becomes. In addition, the shorter the interval of addition (FIG. 2(a)), the larger the amount of rise of the catalyst bed temperature Tc becomes.

In this embodiment, the addition of fuel is carried out by setting the period of addition, the interval of addition, the total period of addition, and the period of the stop of addition (hereinafter, these being collectively referred to as "fuel addition parameters") related to the addition of fuel from the fuel addition valve 5 in such a manner that the catalyst bed temperature Tc and the exhaust gas air fuel ratio A/F in the SOx poisoning recovery control can be adjusted to the target temperature Tct and the target air fuel ratio A/Ft, respectively. In this embodiment, the ECU 10, which serves to control the addition of fuel related to the fuel addition valve 5 corresponds to an execution unit in the present invention.

Here, the release speed (hereinafter "the SOx release speed") Vsox of SOx from the NOx catalyst 3 has a correlation with the amount of SOx occlusion Qsox, the catalyst bed temperature Tc, and the exhaust gas air fuel ratio A/F during the SOx poisoning recovery control, such that the higher the SOx release speed Vsox becomes higher in accordance with the increasing amount of SOx occlusion Qsox, the higher catalyst bed temperature Tc, and the lower exhaust gas air fuel ratio A/F.

Therefore, as the amount of SOx occlusion Qsox is decreasing due to the release of SOx in the course of the SOx poisoning recovery control, the SOx release speed Vsox is decreasing in a gradual manner in cases where the catalyst bed temperature Tc and the exhaust gas air fuel ratio A/F in the SOx poisoning recovery control are set constant. Accordingly, when the SOx release speed Vsox decreases during the SOx poisoning recovery control, there is a possibility that the time of completion of the SOx poisoning recovery control may be delayed.

As a consequence, in this embodiment, the degree of decrease Ddw of the SOx release speed (hereinafter referred to simply as "the degree of decrease of the SOx release speed") resulting from the decreasing of the amount of SOx occlusion Qsox during the SOx poisoning recovery control is estimated in comparison with the amount of SOx occlusion Qsoxs at the time of the start of the execution of the SOx poisoning recovery control (hereinafter referred to as "the amount of SOx occlusion at the time of starting"). Here, the degree of decrease of the SOx release speed Ddw represents the extent to which the SOx release speed Vsox is decreased resulting from the decrease of the amount of SOx occlusion Qsox in comparison with that at the time of the start of the execution of the SOx poisoning recovery control if the catalyst bed temperature Tc and the exhaust gas air fuel ratio A/F during the SOx poisoning recovery control are set constant.

In the SOx poisoning recovery control in this embodiment, the catalyst bed temperature Tc is caused to rise to the higher side target temperature Tct and the exhaust gas air fuel ratio A/F is caused to lower to the richer side target air fuel ratio A/Ft in a stepwise manner in accordance with the increasing degree of decrease of the SOx release speed Ddw, whereby the SOx release speed Vsox can be suppressed from lowering.

Figure 3:
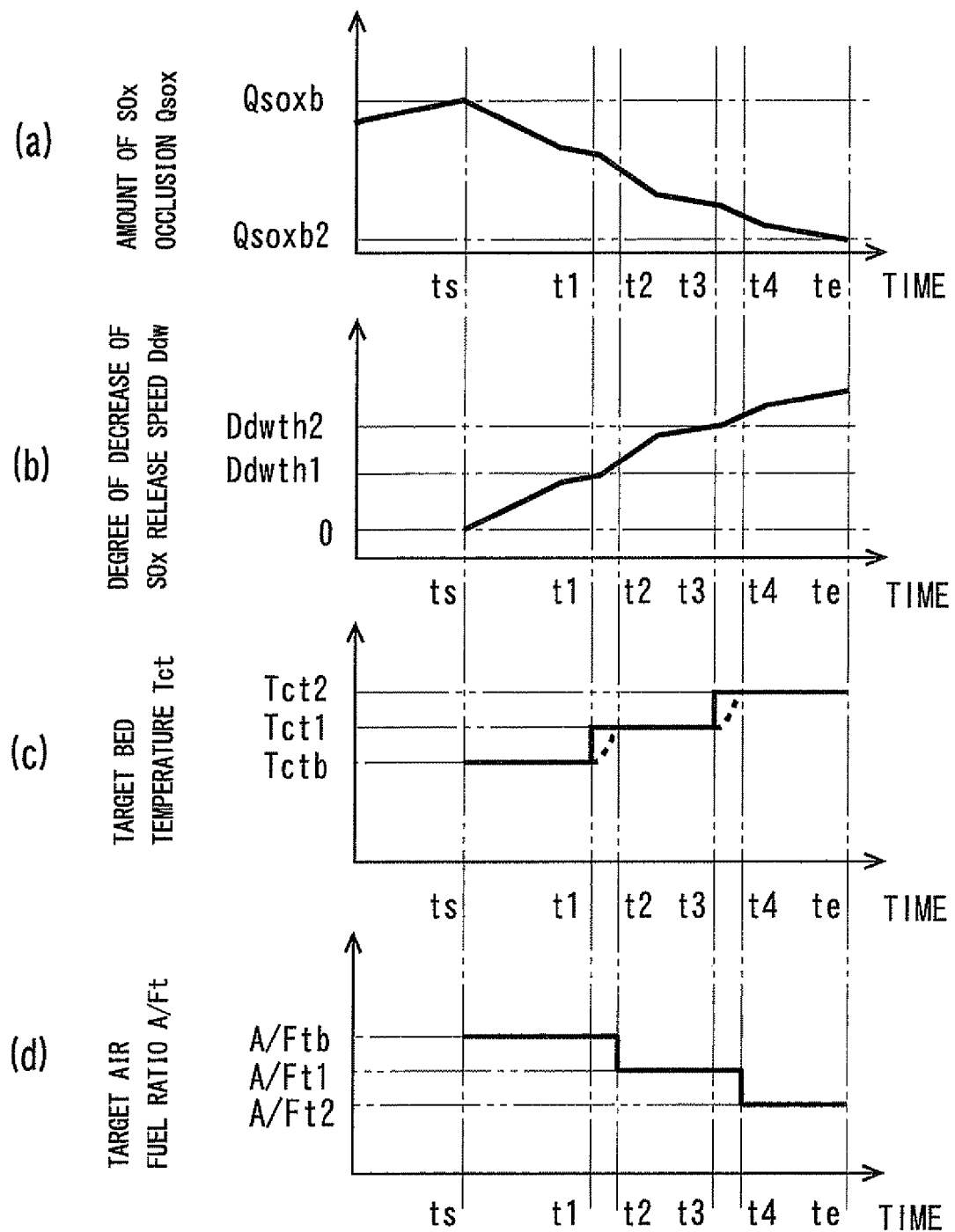
FIG. 3 is a view illustrating time charts of an amount of SOx occlusion Qsox, the degree of decrease of a SOx release speed Ddw, a target temperature Tct, and a target air fuel ratio A/Ft, in the SOx poisoning recovery control of the first embodiment, wherein (a) is a time chart of the amount of SOx occlusion Qsox, (b) is a time chart of the degree of decrease of the SOx release speed Ddw, (c) is a time chart of the target temperature Tct, and (d) is a time chart of the target air fuel ratio A/Ft.

Here, reference will be made to how to set the target temperature Tct and the target air fuel ratio A/Ft related to the SOx poisoning recovery control according to this embodiment while referring to FIG. 3. FIG. 3 is a view illustrating time charts of the amount of SOx occlusion Qsox, the degree of decrease of the SOx release speed Ddw, the target temperature Tct, and the target air fuel ratio A/Ft, in the SOx poisoning recovery control of this embodiment. FIG. 3(a) is a time chart of the amount of SOx occlusion Qsox, FIG. 3(b) is a time chart of the degree of decrease of the SOx release speed Ddw, FIG. 3(c) is a time chart of the target temperature Tct, and FIG. 3(d) is a time chart of the target air fuel ratio A/Ft. In addition, in FIG. 3(c), a broken line shows, in combination, the time change of the actual temperature of the NOx catalyst 3.

A time is shown on the axis of abscissa in these figures indicates the time of the start of the SOx poisoning recovery control, and a time to indicates the time of the termination of the SOx poisoning recovery control. In addition, times t1-t4 will be described later. A condition for starting the execution of the SOx poisoning recovery control in this embodiment is satisfied at the time when the amount of SOx occlusion Qsox occluded in the NOx catalyst 3, which is calculated based on the operation history of the internal combustion engine 1, becomes equal to or more than a reference SOx occlusion amount Qsoxb. Also, a condition for ending the execution of the SOx poisoning recovery control is satisfied at the time when the amount of SOx occlusion Qsox has become equal to or less than a second reference SOx occlusion amount Qsoxb2 due to the execution of the SOx poisoning recovery control.

Here, the reference SOx occlusion amount Qsoxb is an amount of SOx occlusion based on which it can be determined that there is a possibility that the NOx occlusion capacity of the NOx catalyst 3 may be reduced due to the increase in the amount of SOx occlusion Qsox, thereby making the exhaust emission get worse. In addition, the second reference SOx occlusion amount Qsoxb2 is an occlusion amount of SOx with which it can be determined that the SOx occluded in the NOx catalyst 3 has been released to a sufficient extent with a possibility that the NOx occlusion capacity of the NOx catalyst 3 may not be decreased for the time being. The reference SOx occlusion amount Qsoxb and the second reference SOx occlusion amount Qsoxb2 are beforehand obtained through experiments.

In addition, at the time of the start of the SOx poisoning recovery control, the target temperature Tct is set to a target temperature Tctb at the time of starting, and at the same time, the target air fuel ratio A/Ft is also set to a target air fuel ratio A/Ftb at the time of starting. The target temperature Tctb at the time of starting and the target air fuel ratio A/Ftb at the time of starting mean the target temperature Tct and the target air fuel ratio A/Ft at the time of the start of the SOx poisoning recovery control, and are beforehand determined through experiments in such a manner that the release of SOx from the NOx catalyst 3 can be carried out in a suitable manner. In addition, at the time of the start of the SOx poisoning recovery control, the degree of decrease of the SOx release speed Ddw becomes zero (FIG. 3(b)), so the target temperature Tctb at the time of starting and the target air fuel ratio A/Ftb at the time of starting are set, without taking into consideration the influence which the degree of decrease of the SOx release speed Ddw has on the SOx release speed Vsox.

When the SOx poisoning recovery control is started, the ECU 10 calculates a total amount of released SOx Σ Dsox by calculating the amount of SOx occlusion Qsox during the SOx poisoning recovery control and integrating an amount of released Sox Dsox after the start of the SOx poisoning recovery control. Then, the ECU 10 calculates the amount of SOx occlusion Qsox during the SOx poisoning recovery control by subtracting the total amount of released SOx Σ Dsox from the amount of SOx occlusion Qsoxs at the time of starting.

Here, the ratio of the amount of SOx occlusion Qsox during the SOx poisoning recovery control with respect to the amount of SOx occlusion Qsoxs at the time of starting is called a SOx occlusion ratio Rsox (Rsox=Qsox/Qsoxs). In this embodiment, the relation between the degree of decrease of the SOx release speed Ddw and the SOx occlusion ratio Rsox is beforehand obtained through experiments or the like, and a Ddw calculation map is created in which such a relation is stored. Then, the degree of decrease of the SOx release speed Ddw, which is changing during the SOx poisoning recovery control, is estimated by making an access to the Ddw calculation map with the use of the SOx occlusion ratio Rsox as a parameter.

Here, note that the degree of decrease of the SOx release speed Ddw is estimated in such a manner that the degree of decrease of the SOx release speed Ddw becomes larger in accordance with the smaller or decreasing SOx occlusion ratio Rsox. That is, the value of the degree of decrease of the SOx release speed Ddw estimated by the ECU 10 increases in accordance with the decreasing amount of SOx occlusion Qsox during the SOx poisoning recovery control. In this embodiment, the ECU 10, which serves to estimate the degree of decrease of the SOx release speed Ddw, corresponds to an estimation unit in the present invention.

In this embodiment, the SOx release speed Vsox is suppressed from being lowered by changing the target temperature Tct to a higher temperature side and by changing the target air fuel ratio A/Ft to a richer side when the degree of decrease of the SOx release speed Ddw estimated during the SOx poisoning recovery control becomes equal to or larger than a threshold Ddwth. Here, the threshold Ddwth is a value of the degree of decrease of the SOx release speed Ddw with which it can be determined that there is a possibility that the SOx release speed Vsox may be decreased excessively unless the catalyst bed temperature Tc is caused to rise to a higher temperature and at the same time the exhaust gas air fuel ratio A/F is caused to decrease to the richer side.

In addition, with respect to the target temperature Tct and the target air fuel ratio A/Ft, a combination of an optimal target temperature Tot and an optimum target air fuel ratio A/Ft in relation to the degree of decrease of the SOx release speed Ddw is beforehand obtained through experiments or the like, and a target value calculation map is stored in which such a relation is stored in the ECU 10. Here, the target temperature Tct in this embodiment is set so as not to exceed an allowable upper limit temperature. This allowable upper limit temperature is an upper limit temperature which is set in order to suppress a heat deterioration from being generated in the NOx catalyst 3. As a result, the NOx catalyst 3 is suppressed from being caused to excessively rise in temperature during the SOx poisoning recovery control.

Moreover, the target air fuel ratio A/Ft is set so as not to become an air fuel ratio richer than an allowable lower limit air fuel ratio. Here, the allowable lower limit air fuel ratio is an exhaust gas air fuel ratio with which it is determined that the exhaust emission gets worse to an excessive extent when the exhaust gas air fuel ratio A/F becomes lower than this air fuel ratio (i.e., when it becomes a rich air fuel ratio). Specifically, the allowable lower limit air fuel ratio is set so that the amounts of $H_2S$ and HC released into the ambient air during the SOx poisoning recovery control do not exceed their individually set allowable limit values, respectively.

Here, note that the higher the catalyst bed temperature Tc, the more the oxidation function of the NOx catalyst 3 is improved, so the allowable lower limit air fuel ratio shifts to the richer side each time the target temperature Tct is changed to the higher temperature side. Accordingly, by changing the target temperature Tct to the higher temperature side, it becomes possible to decrease the target air fuel ratio A/Ft to the richer side, while suppressing the generation of the deterioration of the exhaust emission.

Here, as shown in FIG. 3(b), in this embodiment, a first threshold Ddwth1 and a second threshold Ddwth2 are respectively set for the threshold Ddwth. The ECU 10 obtains through calculation a first target temperature Tct1 and a first target air fuel ratio A/Ft1 corresponding to Ddwth1 by making an access to the target value calculation map with the use of the degree of decrease of the SOx release speed Ddw (Ddwth1) as a parameter at time t1 at which the degree of decrease of the SOx release speed Ddw becomes the first threshold Ddwth1. Here, it is to be noted that the first target temperature Tct1 is a higher side temperature in comparison with the target temperature Tctb at the time of starting, and the first target air fuel ratio A/Ft1 is a richer side air fuel ratio in comparison with the target air fuel ratio A/Ftb at the time of starting.

In this embodiment, first, at time t1, the target temperature Tct has been changed from the target temperature Tctb at the time of starting to the first target temperature Tct1 (FIG. 3(c)). Then, as shown by the broken line in FIG. 3(c), at time t2 at which the catalyst bed temperature Tc actually rises to Tct1, the target air fuel ratio A/Ft has been changed from the target air fuel ratio A/Ftb at the time of starting to the first target air fuel ratio A/Ft1.

Also, the ECU 10 obtains through calculation a second target temperature Tct2 and a second target air fuel ratio A/Ft2 corresponding to Ddwth2 by making again an access to the target value calculation map with the use of the degree of decrease of the SOx release speed Ddw (Ddwth2) as a parameter at time t3 at which the degree of decrease of the SOx release speed Ddw further increases and becomes the second threshold Ddwth2. Here, it is to be noted that the second target temperature Tct2 is a higher side temperature in comparison with the first target temperature Tct1, and the second target air fuel ratio A/Ft2 is a richer side air fuel ratio in comparison with the first target air fuel ratio A/Ft1.

Then, at time t3, the target temperature Tct is changed from the first target temperature Tct1 to the second target temperature Tct2, and at time t4 at which the catalyst bed temperature Tc actually rises to the second target temperature Tct2, the target air fuel ratio A/Ft is changed from the first target air fuel ratio A/Ft1 to the second target air fuel ratio A/Ft2.

Thus, according to the SOx poisoning recovery control in this embodiment, as the degree of decrease of the SOx release speed Ddw increases during the SOx poisoning recovery control, the target temperature Tct is changed to the higher temperature side, and the target air fuel ratio A/Ft is changed to the richer side, whereby the decrease of the SOx release speed Vsox is suppressed. Accordingly, it becomes possible to make the SOx poisoning recovery control be completed in a shorter period of time.

In addition, because the target air fuel ratio A/Ft is changed to the richer side (A/Ft1, A/Ft2) after the catalyst bed temperature Tc actually rises to the target temperature Tct (Tct1, Tct2), it is suppressed that a large amount of added fuel flows out of the NOx catalyst 3 to generate a white smoke, and also, the generation of a nasty smell resulting from the release of a large amount of $H_2S$ is suppressed.

Figure 4:
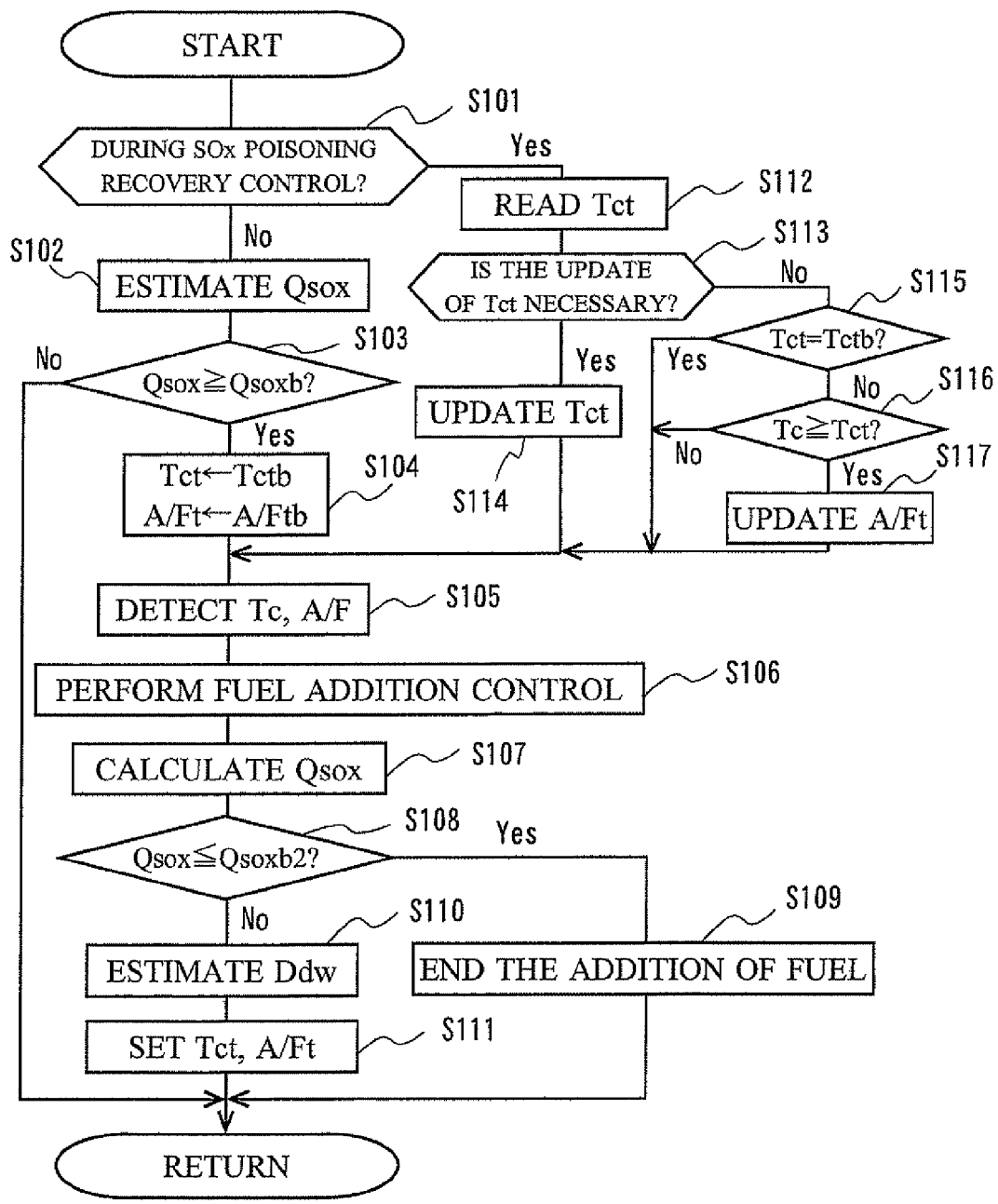
FIG. 4 is a flow chart showing a SOx poisoning recovery control routine in the first embodiment.

FIG. 4 is a flow chart showing a SOx poisoning recovery control routine in this embodiment. This routine is a program which is stored in a ROM of the ECU 10, and is also a routine which is executed every predetermined period of time during the operation of the internal combustion engine 1.

When this routine is executed, first, in step S101, it is determined whether the SOx poisoning recovery control is in operation. In cases where it is determined that the SOx poisoning recovery control is in operation, i.e., the SOx poisoning recovery control is continued, the routine advances to step S112, whereas in cases where it is determined that the SOx poisoning recovery control is not in operation, the routine advances to step S102. Here, note that processing in step 112 will be described later.

In step S102, the amount of SOx occlusion Qsox is estimated based on the operation history of the internal combustion engine 1. Specifically, it is estimated from the amount of fuel consumed in the internal combustion engine 1 after the end of the last SOx poisoning recovery control, or from the mileage, etc., of a vehicle with the internal combustion engine 1 installed thereon, which is related to such an amount of fuel consumption.

In step S103, it is determined whether the amount of SOx occlusion Qsox is equal to or more than the reference SOx occlusion amount Qsoxb. Then, in cases where an affirmative determination (Qsox≧Qsoxb) is made, it is determined that it is necessary to execute the SOx poisoning recovery control, and the routine advances to step S104. On the other hand, in cases where a negative determination (Qsox<Qsoxb) is made, it is determined that it is not necessary to execute the SOx poisoning recovery control, and this routine is once ended. Here, note that when the routine advances from this step to step S104, the amount of SOx occlusion Qsox estimated in this step is stored in the ECU 10 as the amount of SOx occlusion Qsoxs at the time of starting.

In step S104, the target temperature Tct of the NOx catalyst 3 is set to the target temperature Tctb at the time of starting, and at the same time, the target air fuel ratio A/Ft is also set to the target air fuel ratio A/Ftb at the time of starting. In step S105, the output signals of the exhaust gas air fuel ratio sensor 6 and the exhaust gas temperature sensor 7 are read in, and the current catalyst bed temperature Tc and the current exhaust gas air fuel ratio A/F are detected.

In step S106, the fuel addition parameters related to the fuel addition valve 5 as explained with respect to FIG. 2 are set so that the catalyst bed temperature Tc and the exhaust gas air fuel ratio A/F become the target temperature Tct and the target air fuel ratio A/Ft, respectively, and the control of fuel added from the fuel addition valve 5 is carried out in accordance with the fuel addition parameters.

In step S107, the amount of released SOx Dsox is estimated based on the amount of intake air, which is detected based on the output value of the air flow meter 12, and the SOx concentration, which is detected based on the output value of the SOx concentration sensor 8, and then, the total amount of released SOx Σ Dsox, which is an integrated value of the amount of released SOx Dsox after the start of the SOx poisoning recovery control, is calculated. Thereafter, the amount of SOx occlusion Qsoxs at the time of starting stored in step S103 is read in, and the current amount of SOx occlusion Qsox is calculated by subtracting the total amount of released SOx Σ Dsox from the amount of SOx occlusion Qsoxs at the time of starting.

In step S108, it is determined whether the current amount of SOx occlusion Qsox is equal to or less than the second reference SOx occlusion amount Qsoxb2. Then, in cases where an affirmative determination is made (Qsox≦Qsoxb2), it is determined that the SOx poisoning recovery control should be ended, and in the following step S109, the fuel addition control by the fuel addition valve 5 is terminated, and this routine is once ended. On the other hand, in cases where a negative determination (Qsox>Qsoxb2) is made, it is determined that it is necessary to continue the SOx poisoning recovery control, and the routine advances to step S110.

In step S110, the SOx occlusion ratio Rsox, which is the ratio of the current amount of SOx occlusion Qsox with respect to the amount of SOx occlusion Qsoxs at the time of starting, is calculated, and the SOx occlusion ratio Rsox is substituted in the map in which the relation between the degree of decrease of the SOx release speed Ddw and the SOx occlusion ratio Rsox is stored, whereby the degree of decrease of the SOx release speed Ddw is estimated.

In step S111, the target temperature Tct and the target air fuel ratio A/Ft are set according to the degree of decrease of the SOx release speed Ddw, and they are stored in the ECU 10. That is, in cases where the degree of decrease of the SOx release speed Ddw is smaller than the first threshold Ddwth1, the target temperature Tct is set to the target temperature Tctb at the time of starting, and the target air fuel ratio A/Ft is set to the target air fuel ratio A/Ftb at the time of starting, and these target temperature and target air fuel ratio thus set are stored.

In addition, in cases where the degree of decrease of the SOx release speed Ddw is equal to or more than the first threshold Ddwth1 and is smaller than the second threshold Ddwth2, the target temperature Tct is set to the first target temperature Tct1, and the target air fuel ratio A/Ft is set to the first target air fuel ratio A/Ft1, and these target temperature and target air fuel ratio thus set are stored. Moreover, in cases where the degree of decrease of the SOx release speed Ddw is equal to or more than the second threshold Ddwth2, the target temperature Tct is set to the second target temperature Tctb2, and the target air fuel ratio A/Ft is set to the second target air fuel ratio A/Ft2, and these target temperature and target air fuel ratio thus set are stored. When the processing of this step ends, this routine is once ended.

Next, reference will be made to the control content at the time when it is determined in step S101 that the SOx poisoning recovery control is continued. In that case, the routine goes to step S112, as stated above. In step S112, the target temperature Tct stored in step Sill is read in. Then, in step S113, it is determined whether it is necessary to update the target temperature Tct. That is, in cases where the current target temperature Tct differs from the target temperature Tct read in step S112, an affirmative determination is made, and the routine advances to step S114. On the other hand, in cases where the current target temperature Tct is the same as the target temperature Tct read in step S112, a negative determination is made, and the routine advances to step S115.

In step S114, the target temperature Tct is updated to the value read in step S112. Then, after the processing of this step ends, the routine advances to step S105, and the SOx poisoning recovery control is continued. On the other hand, in step S115, it is determined whether the target temperature Tct read in step S112 is the target temperature Tctb at the time of starting. In cases where an affirmative determination is made, the routine advances to step S105, and the SOx poisoning recovery control is continued. On the other hand, in cases where a negative determination is made, the routine advances to step S116.

In step S116, the catalyst bed temperature Tc is detected, and at the same time, it is determined whether the catalyst bed temperature Tc has risen up to the target temperature Tct (i.e., whether it has become equal to or more than the target temperature Tct). The target temperature Tct here is the latest target temperature that has been updated in step S114. Then, in cases where an affirmative determination is made in this step (Tc≧Tct), it is determined that there is no fear that the exhaust emission may get worse even if the target air fuel ratio A/Ft is changed to the rich side, and the routine advances to step S117. On the other hand, in cases where a negative determination is made (Tc<Tct), it is determined that there is a fear that the exhaust emission may get worse when the target air fuel ratio A/Ft is changed to the rich side, and the routine advances to step S105, where the SOx poisoning recovery control is continued while keeping the current target air fuel ratio A/Ft as it is.

In step S117, the target air fuel ratio A/Ft stored in step S111 is read in, and the existing target air fuel ratio A/Ft is thus updated. Then, after the processing of this step ends, the routine advances to step S105, and the SOx poisoning recovery control is continued.

As described above, according to the SOx poisoning recovery control according to this embodiment, the catalyst bed temperature Tc is caused to rise up to the higher temperature side target temperature Tct in a stepwise manner and at the same time to lower the exhaust gas air fuel ratio A/F up to the richer side target air fuel ratio A/Ft in accordance with the increasing degree of decrease of the SOx release speed Ddw, whereby the SOx release speed Vsox can be suppressed from lowering.

Here, note that in this embodiment, reference has been made, by way of example, to the case where two threshold values (the first threshold Ddwth1 and the second threshold Ddwth2), which are different in magnitude from each other, are set as the threshold Ddwth of the degree of decrease of the SOx release speed Ddw, but the present invention is not limited to this. For example, by setting the threshold Ddwth more finely in accordance with the magnitude of the degree of decrease of the SOx release speed Ddw, it is possible to suppress the decrease of the SOx release speed Vsox during the SOx poisoning recovery control in a finer manner. In addition, it is also possible to more simplify the content of processing of the SOx poisoning recovery control by setting the single threshold Ddwth, for example.

In addition, the target temperature Tct and the target air fuel ratio A/Ft in this embodiment may be changed in a continuous manner in accordance with the increasing degree of decrease of the SOx release speed Ddw. That is, as the degree of decrease of the SOx release speed Ddw becomes larger, the target temperature Tct may be continuously changed to the higher temperature side and the target air fuel ratio A/Ft may be continuously changed to the richer side.

Although in this embodiment, fuel acting as a reducing agent is supplied to the NOx catalyst 3 by adding fuel into the exhaust gas from the fuel addition valve 5, it may of course be possible to supply fuel to the NOx catalyst 3 by auxiliary injection in which fuel is injected from a fuel injection valve (illustration omitted) arranged in each cylinder of the internal combustion engine 1 at different timing (e.g., in an expansion stroke, in an exhaust stroke, etc.) from main injection from the fuel injection valve.

The invention claimed is:

1. An exhaust gas purification system of an internal combustion engine, comprising:
    a NOx storage reduction catalyst that is arranged in an exhaust passage of the internal combustion engine; and
    an electronic control unit including logic that, when executed, performs the steps of:
        executing SOx poisoning recovery control to cause SOx occluded in said NOx storage reduction catalyst to be released therefrom by supplying a reducing agent to said NOx storage reduction catalyst from an upstream side thereof thereby to raise the temperature of said NOx storage reduction catalyst and at the same time to lower the air fuel ratio of an exhaust gas flowing into said NOx storage reduction catalyst; and
        estimating, with respect to the time of the start of the SOx poisoning recovery control, the degree of decrease of a SOx release speed resulting from a decrease in an amount of SOx occlusion of said NOx storage reduction catalyst in the course of said SOx poisoning recovery control,
            wherein said electronic control unit causes the temperature of said NOx storage reduction catalyst to rise up to a higher side target temperature in accordance with the increasing degree of decrease of said SOx release speed estimated by said electronic control unit.

2. The exhaust gas purification system of an internal combustion engine as set forth in claim 1,
    wherein said control unit controls such that said target temperature, in the case of the degree of decrease of said SOx release speed being larger, becomes equal to or higher than in the case of the degree of decrease of said SOx release speed being smaller.

3. The exhaust gas purification system of an internal combustion engine as set forth in claim 1,
    wherein said electronic control unit decreases the air fuel ratio of said exhaust gas up to a richer side target air fuel ratio in accordance with the increasing degree of decrease of said SOx release speed estimated by said electronic control unit.

4. The exhaust gas purification system of an internal combustion engine as set forth in claim 3,
    wherein said electronic control unit controls such that said target air fuel ratio, in the case of the degree of decrease of said SOx release speed being larger, becomes equal to or lower than in the case of the degree of decrease of the SOx release speed being smaller.

5. The exhaust gas purification system of an internal combustion engine as set forth in claim 2,
    wherein said electronic control unit decreases the air fuel ratio of said exhaust gas up to a richer side target air fuel ratio in accordance with the increasing degree of decrease of said SOx release speed estimated by said electronic control unit.

6. The exhaust gas purification system of an internal combustion engine as set forth in claim 5,
wherein said electronic control unit controls such that said target air fuel ratio, in the case of the degree of decrease of said SOx release speed being larger, becomes equal to or lower than in the case of the degree of decrease of the SOx release speed being smaller.

* * * * *